United States Patent Office 3,404,992
Patented Oct. 8, 1968

3,404,992
METHOD FOR PROTECTING ORGANIC MATERIAL AGAINST THE DEGRADATIVE EFFECTS OF ULTRA-VIOLET LIGHT RADIATION
Albert F. Strobel, Delmar, and Sigmund C. Catino, Castleton, N.Y., assignors to GAF Corporation, a corporation of Delaware
No Drawing. Continuation-in-part of application Ser. No. 97,758, Mar. 23, 1961. This application June 23, 1965, Ser. No. 466,411
14 Claims. (Cl. 106—176)

ABSTRACT OF THE DISCLOSURE

A method for protecting organic material against the degradative effects of ultra-violet radiation which comprises incorporating into said organic material an essentially colorless compound of the formula

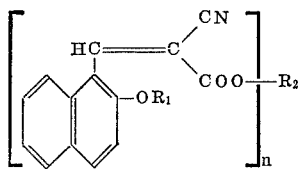

wherein $R_1$ is a radical selected from the group consisting of alkyl radicals of from 1 to 9 carbon atoms and alkenyl radicals of 3 to 9 carbon atoms and $n$ is an integer from 1 to 2, and when $n$ is 1, $R_2$ is a radical selected from the group consisting of alkyl, hydroxyalkyl, haloalkyl, cyanoalkyl, alkoxyalkyl, hydroxy, alkoxyalkyl, carbalkoxyalkyl, alkenyl, aryl, substituted aryl, and hetero radicals, and when $n$ is 2, $R_2$ is a radical selected from the group consisting of alkylene, substituted alkylene, arylene, substituted arylene, and bi-substituted heterocyclic radicals.

---

This application is a continuation-in-part of co-pending application Serial No. 97,758, filed Mar. 23, 1961, and now abandoned.

This invention relates to new and useful compositions which are characterized as having superior resistance to degradation and deterioration when exposed to actinic radiation and in particular to organic compositions which are protected against deterioration when exposed to such radiations by the incorporation therewith of 2-alkoxy-α-cyano-1-naphthaleneacrylic esters. This invention further relates to processes for preventing the deterioration and degeneration of organic materials when exposed to actinic radiations, and in particular to ultra-violet radiations. This invention still further relates to processes for the stabilization against deterioration by ultra-violet light of organic materials by the use of 2-alkoxy-α-cyano-1-naphthaleneacrylic esters.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency property may not be paramount.

We have discovered that by combining 2-alkoxy-α-cyano-1-naphthaleneacrylic esters with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds which are employed in the compositions and processes of this invention, even though they exhibit outstanding absorbing properties close to the visible region of the electro-magnetic field, nevertheless are essentially colorless compounds and can be employed with the assurance that they will not contribute to color in normally colorless formulations, nor will they affect the color of a colored formulation such as a paint film or a dyed textile. Many of the compounds employed in the compositions and processes of this invention also absorb some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

It is therefore an object of the present invention to provide new and useful compositions characterized by improved resistance to degradation and deterioration by ultra-violet radiation.

It is still another object of this invention to provide compositions containing 2-alkoxy-α-cyano-1-naphthaleneacrylic esters which are resistant to ultra-violet deterioration.

It is a still further object of this invention to provide processes for improving the resistance of organic materials to deterioration and degradation by actinic radiation and especially ultra-violet radiation.

It is a still further object of this invention to provide compositions and processes for improving the resistance of organic materials to deterioration and degradation by actinic radiations including short wave length visible radiations.

Other objects and advantages will appear hereinafter as the description proceeds.

The 2-alkoxy-α-cyano-1-naphthaleneacrylic esters which are employed in the compositions and processes of this invention are characterized by the following general formula:

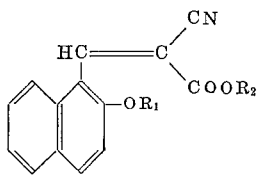

(I)

wherein $R_1$ is a lower alkyl of from 1 to 9 carbon atoms or lower alkenyl radical of from 3 to 9 carbon atoms, as, for example, methyl, ethyl, propyl, isopropyl, butyl, isobutyl, amyl, hexyl, heptyl, octyl, nonyl, allyl and the like, and $R_2$ is alkyl, hydroxyalkyl, haloalkyl, cyanoalkyl, alkoxyalkyl, hydroxyalkoxyalkyl, carbalkoxyalkyl, alkenyl, aryl, substituted aryl, hetero and the like.

The carbon atom content of the alkyl and alkenyl moieties of $R_2$ is not critical and may vary from 1 to about 30. The same limitation applies as well to the enumerated substituted forms. The substituted aryl moieties, as illustrated below, contain the usual non-chromophoric substituents such as alkyl, alkoxy, halogen, carboxy, carboalkoxy, acylamino, alkylsulfonyl, cyano, and the like. Chromophores are to be avoided, obviously, since the compounds used in this invention must be colorless or substantially so. Groups to be specifically avoided are azo and nitro, as well as amino groups bonded directly to the naphthalene ring.

The following specific substituents for $R_2$ may be employed in the above generic formulation: methyl, ethyl, propyl, iso-propyl, n-butyl, iso-butyl, n-amyl, iso-amyl, hexyl, heptyl, nonyl, decyl, undecyl, lauryl, tetradecyl, cetaryl, and the like, propenyl, iso-propenyl, allyl, 1-butenyl, 2-butenyl, 3-butenyl, 1-methylpropenyl, 1-pentenyl, methyl-1-butenyl, hexenyl, heptenyl, octenyl, nonenyl, decenyl, undecenyl, oleyl, tetradecenyl, hexadecenyl, octadecenyl, cyanoethyl, cyanopropyl (N-propyl, isopropyl), cyanobutyl (N-butyl, isobutyl, etc.), cyanoamyl, cyanohexyl, cyanooctyl, cyanononyl, cyanodecyl, cyanoundecyl, cyanolauryl, and the like, hydroxyethyl, hydroxypropyl (N-propyl, isopropyl), hydroxybutyl (N-butyl, isobutyl, etc.), hydroxyamyl, hydroxyhexyl, hydroxydecyl, hydroxylauryl, and the like, chloroethyl, chloropropyl (N-propyl, isopropyl), chlorobutyl (N-butyl, isobutyl, etc.), chloroamyl, chlorohexyl, chlorodecyl, chlorolauryl, and the like, bromoethyl, bromopropyl (N-propyl, isopropyl), bromobutyl (N-butyl, isobutyl, etc.), bromoamyl, bromohexyl, bromodecyl, bromolauryl, and the like, methoxyethyl, methoxypropyl (N-propyl, isopropyl), methoxybutyl (N-butyl, isobutyl, etc.), methoxyamyl, methoxyhexyl, methoxydecyl, methoxylauryl, and the like, ethoxyethyl, ethoxypropyl (N-propyl, isopropyl), ethoxybutyl (N-butyl, isobutyl, etc.), ethoxyamyl, ethoxyhexyl, ethoxydecyl, ethoxylauryl, and the like, polyhydroxyalkyls, e.g., glycaryl.

Heterocyclics: furyl, tetrahydrofurfuryl, benzofuryl, thienyl, pyrryl, pyrrolidyl, 2-pyrrolidonyl, indolyl, carbazolyl, oxazolyl, thiazolyl, pyrazolyl, pyridyl, pyrimidyl, quinolyl, and the various alkyl, alkoxy, halo, carboxy, carboxalkoxy, acyl, and acylamino derivatives of the aforementioned heterocyclic radicals.

Aryls: phenyl, α-naphthyl, β-naphthyl, α-anthracyl, β-anthracyl, γ-anthracyl, cumyl, phenanthranyl, anisole, phenetole, tolyl, p-diethoxyphenyl, 1-methoxy phenanthryl, β-naphthyl methyl ether, β-naphthyl ethyl ether, hydroxyethyl phenyl, hydroxypropyl phenyl, p-hydroxyethyl naphthyl, chlorophenyl, bromophenyl, 1,2-dichlorophenyl, 1,3-dichlorophenyl, 1,3,5-trichlorophenyl, 1,2-dibromophenyl, o-chlorotolyl, m-chlorotolyl, m-bromotolyl, bromo-o-xylyl, α,β-dichloro naphthyl, 4-bromoacenaphthyl, methylsulfonylphenyl, ethylsulfonylphenyl, cyanophenyl, cyanonaphthyl, carboxyphenyl, carboxytolyls, carboxyxylyls, carbalkoxyphenyls, e.g., carbomethoxyphenyl, carboethoxyphenyl, carbalkoxytolyls, e.g., carbomethoxytolyls, acetophenyl, propiophenyl, butyrophenyl, lauroylphenyl, p-acetotolyl, benzoyl naphthyl, acetaminophenyl, acet-methylamino phenyl, acetoaminotolyls, acetoaminonaphthyls, propio-aminophenyl, propio-aminotolyls.

In addition, $R_2$ may represent a substituent of the formula:

$$R_3X$$

wherein X is formula (I) devoid of the $R_2$ substituent and $R_3$ is a bridging group which may be alkylene, substituted alkylene, arylene, substituted arylene or heterocyclic, e.g.,

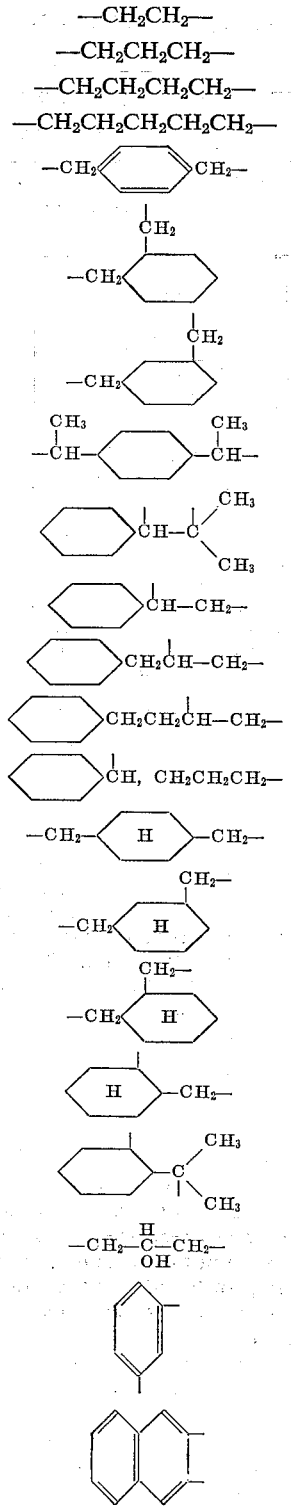

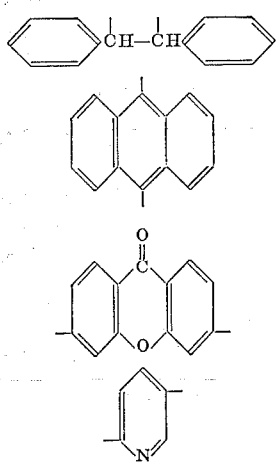

thereby giving rise to bis-products of the formula:

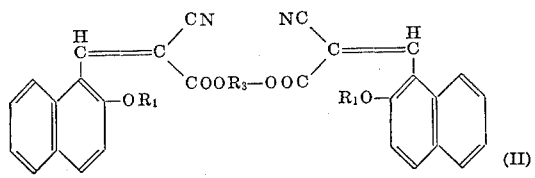

wherein $R_1$ and $R_3$ have the meanings designated above.

The general process for the preparation of the compounds of Formula I involves the condensation of a 2-alkoxy-1-naphthaldehyde with an α-cyano-acetic ester in the presence of an amine catalyst as described in copending application Ser. No. 13,720 filed Mar. 9, 1960, now U.S. Patent 3,085,097.

As described in said aforementioned application the usual procedure involves heating a mixture of the reactants in the presence of the basic catalyst at elevated temperatures until the reaction has gone to completion. A solvent may be employed to effect miscibility of the reactants and when such a solvent is used, the temperature of the reaction will usually be the reflux temperature of the solvent solution of the ingredients. Ethyl alcohol is the preferred solvent in such reaction. In the absence of a solvent, temperatures of the order of 75 to 150° C. may be used. The time of reaction will of course vary depending upon the specific reactants and the temperature used. In some instances a relatively low temperature for a short period of time effects the formation of a substantially quantitative yield of the desired ester. In other cases, longer times and higher temperatures are necessary to get the best yields. It is of course again obvious to one skilled in the art to ascertain for any given combination of reactants the most efficacious combination of temperature and time.

Upon the completion of the esterification reaction, the desired ester is isolated, usually by evaporation of the volatile constituents, namely, water which is liberated in the condensation reaction, any alcohol which may be employed as a solvent, and the basic catalyst where the latter is a liquid and normally and readily removable by distillation or volatilization. It is also possible in certain instances, to isolate the desired ester product by diluting the reaction mixture with a solvent which precipitates out the ester. Thus, methanol may be employed in many cases as such a diluent, and the resultant slurry is then filtered at low temperatures (0 to 5° C.) to separate the crystalline product.

The compounds of the general Formula II above are prepared in a similar manner except that instead of employing cyanoacetic acid derivatives containing a single active methylene grouping, one employs a polycyanoacetate of a polyhydric alcohol using 2 moles of the aldehyde for each mole of the polycyanoacetate, thereby giving rise to the best compounds of Formula II. The polycyanoacetates are, of course, first prepared, and usually in the manner described in U.S. Patent 2,426,056, from the corresponding polyhydric alcohol and cyanoacetic acid in the presence of an acidic catalyst.

Formulae I and II may be generically represented by the following general formula:

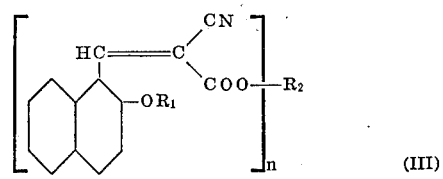

wherein $R_1$ and $R_2$ are as designated above in Formula I and additionally $R_2$ may be the same as $R_3$ in Formula II and $n$ is the integer 1 or 2; when $n=1$, $R_2$ is as in Formula I and when $n=2$, $R_2$ is as defined in Formula II.

In addition to the above contemplated derivatives, further compounds which are within the purview of this invention are the polyoxyalkylated compounds derived from reactive hydrogen containing compounds, i.e., in the instant case, hydroxy compounds and an alkylene oxide or a compound functioning as an alkylene oxide such as ethylene oxide, propylene oxide, butylene oxide, butylene dioxide, cyclohexane oxide, epichlorohydrin, butadiene dioxide, isobutylene oxide, styrene oxide, mixtures thereof and the like.

The following examples will serve to illustrate the present invention without being deemed limitative thereof. Unless otherwise indicated, parts are by weight.

Example 1

Preparation of α-cyano-2-ethoxy-1-naphthaleneacrylic acid, ethyl ester:

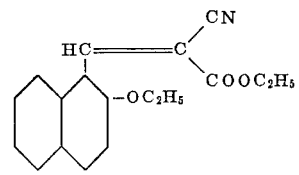

A mixture of 74 g. (0.37 mole) 2-ethoxy-1-naphthaldehyde, 41.8 g. (0.37 mole) α-cyanoethyl acetate, and 0.85 g. (0.01 mole) piperidine is stirred 1 hour at 95° C. The reaction mixture is allowed to cool to 60° C. and diluted with 120 mls. methanol. The slurry is filtered at 3° C to separate the crystalline product. The filter cake is washed with 70 mls. methanol and air dried at room temperature. The yield is 102 gms. of material of M.P. 70°-78° C., which corresponds to a yield of about 95%.

Example 2

Application of ester of Example 1:
Incorporation of this material into cellulose acetate is carried out as follows:

0.375 gm. α-cyano-2-ethoxy-1-naphthaleneacrylic acid ethyl ester, 3.5 gms. ethanol, 6.5 gms. methyl Cellosolve, 9.0 gms. ethyl acetate, 26 gms. cellulose acetate dope (consisting of 3.75 gms. cellulose acetate in 21 gms. acetone)

are mixed with stirring until a clear solution is obtained The material is poured into a mold and the solvent evaporated to give a block of cast material of ⅛″ thickness A similar block is prepared in the same fashion only omitting the naphthaleneacrylic acid derivative. The cast material containing the ultra-violet absorber gives better stability to light to food materials stored behind it than the cast block without the ultra-violet absorber.

Example 3

Preparation of

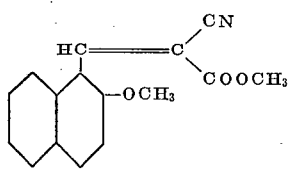

This compound is prepared from 2-methoxy-1-naphthaldehyde and α-cyanomethyl acetate in the same manner the compound in Example 1.

Example 4

A composition comprising the following ingredients is epared:

% cellulose acetate (pulverized)
75% triphenyl phosphate
.6% methyl Cellosolve
.8% ethyl acetate
.3% ethyl alcohol The above components are added in the above order d rolled until the cellulose acetate dissolved. 50 gms. the dope is weighed out and 0.05 gm. of the absorber Example 5 then added and dissolved. (Approximately % of total solids.) Films are cast from these solutions a clean glass plate using a doctor blade with a 6 mil ening to obtain a dry film approximately 6 mils thick. control film without ultra-violet absorber is also pred for comparison.
The film containing ultra-violet absorber shows defitely better protection of foods stored behind it upon posure to light than the film without the ultra-violet sorber.

Example 5

Preparation of:

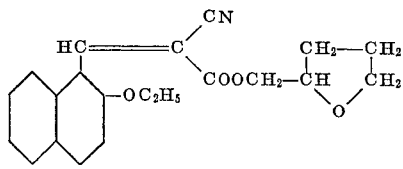

The intermediate

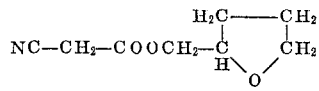

first prepared:

0 gms. (2 moles) of cyanoacetic acid is mixed with 2 gms. (2.2 moles) of tetrahydrofurfuryl alcohol, 300 ls. chloroform, and 10 gms. of a mixed alkane sulnic acid catalyst in a 1-liter flask equipped with connser and water separator. The material is heated unr reflux on a steam bath until no more water is taken f. The product is treated with 20% (wt./vol.) sodium droxide and washed until neutral to delta paper. The oduct is extracted with chloroform, dried, solvent reoved, and distilled at 140°–144° C. at 0.5 mm. Yield= %. This intermediate (0.37 mole) is then condensed th 0.37 mole of 2-ethoxy-1-naphthaldehyde in the folwing manner: A mixture of 0.37 mole of the aldehyde, d 0.37 mole of the intermediate above prepared, with 01 mole of piperidine is stirred for 1 hour at 95° C. e reaction mixture is then allowed to cool to 60° C. d diluted with 120 mls. of methanol. A slurry is produced, which slurry is filtered at 3° C. to separate the crystalline product. The filter cake is then washed with 100 mls. of methanol and air dried at room temperature.

Example 6

The product of Example 5 is applied to polyethylene as follows:

0.5 gm. ultra-violet absorber of Example 5
99.5 gms. polyethylene wax PT 95504 (semet-solvay)

are melted at 120° C. to give a solution. The material is then pressed out in a Carver press to give a film of about ⅛ in. thickness. Meat stored behind the film containing absorber is less discolored on exposure to light than meat stored behind similar film prepared without absorber.

Example 7

Preparation of:

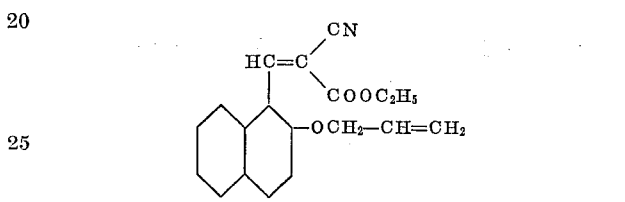

The intermediate 2-allyloxy-1-naphthaldehyde is first prepared according to the following reaction:

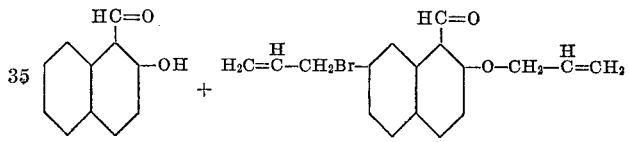

A mixture of 12 gms. 2-hydroxy-1-naphthaldehyde (0.07 mole), 4 gms. potassium, 75 mls. alcohol, and 15 gms. allyl bromide (0.14 ml.) is refluxed 5 hours. The precipitate of potassium bromide is filtered, and the alcohol and excess allyl bromide is distilled from the filtrate. The residue from distillation is treated with sodium hydroxide solution to separate unchanged naphthaldehyde. The residue is further washed with water to give a substantially pure residue of 2-allyloxy-1-naphthaldehyde.

The 2-allyloxy-1-naphthaldehyde is then condensed with α-cyanoethyl acetate in the following manner. A mixture of 0.37 mole of the naphthaldehyde, 0.37 mole of α-cyanoethyl acetate, and 0.01 mole piperidine is stirred for 75 min. at 90° C. The reaction mixture is then allowed to cool to about 60° C. and then diluted with 120 mls. methanol. The resultant slurry is filtered at 0° C. to separate the crystalline product. The filter cake is washed with methanol and air dried at room temperature. A substantially quantitative yield of the product of the above structural representation is obtained.

Example 8

The product of Example 7 is applied to "Dacron" (ethylene glycol-terephthalic acid polyester) fiber as follows:

A 10 gms. swatch of Dacron fiber is heated at 205° F. for 1 hour in a water bath containing 300 mls. water and 0.3 gm. of the above ultra-violet absorber dispersed with 0.3 gm. of nonylphenol condensed with 12 moles of ethylene oxide. The 0.3 gm. of absorber is dissolved first in 5 mls. of alcohol and the alcohol solution is poured into the 300 mls. of water containing the emulsifier. The cloth is removed, rinsed and dried. Cloth so treated shows more stability toward discoloration on exposure to light than untreated cloth.

Example 9

Preparation of:

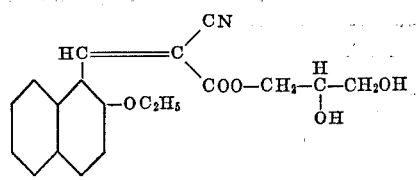

The mono-glyceryl ester of cyanoacetic ester is first prepared as follows:

94 gms. (1 mole) of cyanoacetic acid (90% pure)
184 gm. glycerol (2 moles)
13.9 gms. of toluenesulfonic acid
200 mls. benzene are refluxed together for 24 hours.

The water liberated during the reaction is removed with a water trap (18 mls. (1 mole) of water collected). The catalyst is neutralized with sodium bicarbonate solution. The material is saturated with NaCl and then extracted with ethyl acetate. The ethyl acetate extract is dried with anhydrous sodium acetate and the solvent is distilled off, leaving the light brown oil of

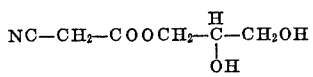

2-ethoxy-1-naphthaldehyde is condensed with the above glyceryl ester of cyanoacetic acid as in Example 1, employing the same molar amounts of reactants to give the ultra-violet absorber.

Example 10

A film of cellulose butyrate is prepared using cellulose butyrate in place of the cellulose acetate in Example 2. Also, a similar film is prepared from cellulose butyrate in this way containing 1% of the ultra-violet absorber prepared from the above glyceryl ester of Example 9. The film containing the ultra-violet absorber gave more protection against darkening to meat stored behind it than the film free of absorber upon exposure of each to daylight for several days.

Example 11

Application of

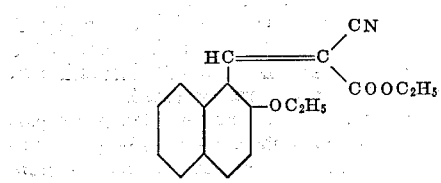

to furniture polish:
A melt is made on a steam bath of:

9 oz. carnauba wax
1.5 pints turpentine
1.75 pints hot water containing 2 oz. soap The whole mixture is beaten with a high speed stirrer. A similar formulation is made containing 2% based on the weight of carnauba wax of the ultra-violet absorber α-cyano-2-ethoxy-1-naphthaleneacrylic acid, ethyl ester.

The formulation containing the ultra-violet absorber when applied to stained and varnished oak gives better protection against discoloration (darkening) by light than the formulation free of absorber.

Example 12

Application of α-cyano-2-ethoxy-1-naphthaleneacrylic acid, ethyl ester for the stabilization of coloring matters incorporated in plastics:

A lacquer drawdown on "Krome-Kote" paper of 2% of Azosol Fast Yellow RCA (anthranilic acid - 4 - sulfophenylmethylpyrazolone, Cr, dicyclohexylamine salt), 2% of α - cyano - 2 - ethoxy-1-naphthaleneacrylic acid , ethyl ester in nitrocellulose is made as well as a comparative nitrocellulose lacquer formulation containing 2% Azosol Fast Yellow RCA without ultra-violet absorber. After 500 hours fadeometer exposure, the lacquer containing the ultra-violet absorber showed substantially less fading.

Example 13

Preparation of

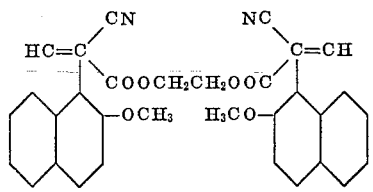

Ethylene glycol di-(α-cyanoacetate) is first prepared according to the method described in Example 1 of U.S. Patent 2,426,056 using excess cyanoacetic acid. One molecular equivalent of the crude product isolated is condensed with 372 g. (2 molecular equivalents) of 2-methoxy-1-naphthaldehyde in the presence of 10 gms. piperidine, boiling for 3 hours with 1 liter of ethyl alcohol as solvent. The alcohol and piperidine are evaporated and the ultra-violet absorber so isolated is used in the crude state in Polylite 8000 (a polyester resin of 30% styrene and 70% glyceral phthalate maleate) as illustrated in the following example.

Example 14

The resin is prepared by adding 1 gm. of a 50% solution of benzoyl peroxide in tricresyl phosphate to Polylite 8000. 0.25 gm. of the above ultra-violet absorber is then added to 100 gms. resin. A clear coating of polyester is made between glass plates spaced ¼ in. apart. The resin is cured by placing the material in an oven at 65° C., then raising the temperature slowly to 90° C., holding 1 hour, then raising temperature to 125° C. and holding 1 hour to complete the cycle. The resultant sheet is more stable to sunlight than a similar sheet devoid of the absorber.

Example 15

Preparation of

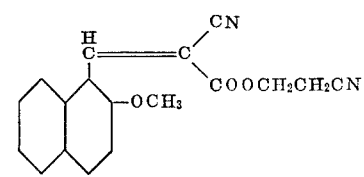

One mole of 2-methoxy-1-naphthaldehyde is condensed with one mole of cyanoethylcyanoacetate in the presence of 0.05 mole of piperidine employing 800 ml. of ethyl alcohol as a solvent. The condensation is effected by refluxing the mixture for 2 hours. After the reaction is complete, the reaction mass is cooled to 40° C. and diluted with 1 liter of methanol. A slurry forms; this is filtered at 0° C. and a crystalline product is isolated.

Example 16

The compound of Example 15 is tested for its ultra violet protecting characteristics as in Example 8 and found to be outstanding.

In the following Examples 17–35, wherein $n$, $R_1$ and $R_2$ are as indicated in Formula III above, the compounds are tested in the indicated compositions:

The compounds used in this invention are in general soluble in a great variety of solvents, plastics, resins, waxes and the like, and therefore are particularly adapt-

| Ex. | n | $R_1$ | $R_2$ | Composition |
|---|---|---|---|---|
| | 1 | Butyl | Ethyl | Of Example 2. |
| | 1 | Ethyl | Allyl | On Dacron as in Example 8. |
| | 1 | Nonyl | Ethyl | Of Example 11. |
| | 1 | Methyl | Nonyl | Do. |
| | 1 | Crotyl | Ethyl | On Dacron as in Example 8. |
| | 1 | Ethyl | Nonyl | Of Example 6. |
| | 1 | Methyl | Hydroxyethyl | Of Example 2. |
| | 1 | Ethyl | Chlorethyl | Of Example 10. |
| | 1 | do | Methoxyethyl | Do. |
| | 1 | do | p-Methoxyphenyl | Of Example 12. |
| | 1 | Allyl | Hydroxyethyl | On Dacron as in Example 8. |
| | 1 | Methallyl | Ethoxyethyl | Do. |
| | 2 | Ethyl | —CH₂CH₂CH₂— | Do. |
| | 2 | n-Propyl | —CH₂—C(CH₂)(cyclohexyl) | Do. |
| | 1 | Ethyl | Cyclohexyl | Of Example 2. |
| | 1 | β-Nonylene [1] | Ethyl | Of Example 6. |
| | 2 | Ethyl | —C₆H₄—CH(H)—CH(H)—C₆H₄— [2] | Of Example 14. |
| | 2 | Methyl | pyridyl [3] | Epon resin*. |
| | 2 | n-Propyl | —HC CH— [4] (naphthalene) | Of Example 6. |

The β-nonylene ether of 2-hydroxy-1-naphthaldehyde is prepared similarly as the allyl ether of Example 7 by condensation of 1-bromo-nonene [2] with 2-hydroxy-1-naphthaldehyde.
The di(cyanoacetate) is preparaed from α,α'-diphenylethyleneglycol and cyanoacetic acid similarly as in ample 13 for the ethylene glycol derivative.
The di(cyanoacetate) is prepared from 2,5-dihydroxy pyridine and cyanoacetic acid following the procedure Example 13 for the ethylene glycol derivative.
The di(cyanoacetate) is prepared from acenaphthyleneglyco land cyanoacetic acid as per procedure of Example 13.

As described above, polyoxyllated derivatives may be epared containing from one to 100 oxyalkylene groups. ie folowing examples are illustrative.

Example 36

The compound of Example 23 is polyoxyalkylated with ιylene oxide by adding to 1 mole thereof 1.3% by :ight of potassium hydroxide and then 5 moles of ethne oxide in an autoclave at 80° C.

Example 37

Example 36 is repeated by employing 35 moles of eth:ne oxide to yield a product containing 35 oxyethyl oups.

Example 38

Example 36 is repeated using 10 moles of propylene .ide in lieu of ethylene oxide. The resultant product conins 10 oxypropyl groups.

Example 39

Example 38 is repeated and then 10 moles of ethylene .ide are further added to give a product containing 10 .ypropyl groups and 9 oxyethyl groups and a terminal droxyethyl group.

Example 40

The product of Example 36 is dispersed in water (5 /100 water) and used to treat paper and cotton.

Example 41

The product of Example 37 is employed to prepare ι oil-in-water emulsion (1 g. product; 30 g. Varsol; 70 water). A stable emulsion results. Pigments dispersed such emulsions are admirably protected against ultra-ɔlet light degradation.

able for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water in the case of oxyethylene groups, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films agaianst fading of pigments and dyes contained therein.

Of particularly outstanding significance is the use of the compounds herein described in combination with high molecular weight polymers of formaldehyde such as Delrin. The incorporation of from 1 to 5% of the compounds described herein in such polymers yields an outstanding improvement in the stability of the polymer. The compounds may be incorporated in the finished polymer or preferably in the polymerizing mass. Other stabilizers such as the benzothiazoles and the benzophenones cannot be used in this manner since they cause depolymerization.

Another outstanding use of the compounds lies in the employment thereof in the transparent backings of pressure-sensitive tapes whereby the adhesive is protected against the degradative effects of the environment and particularly of the active radiations. In such use, the compounds may be added to the plastic backing material in the manufacture thereof or impregnated or coated thereon or therein.

Other variations in and modifications of the described processes which will be obvious to those skilled in the art can be made in this invention without departing from the scope or spirit thereof.

We claim:

1. A method for protecting organic carrier material against the degradative effects of ultra-violet radiation which comprises incorporating with said organic carrier from about 0.05% to about 2% by weight based on the weight of the organic material, as an absorber for ultra-violet radiation, an essentially colorless compound capable of absorbing ultra-violet light in the range of 250–400 millimicrons having the formula

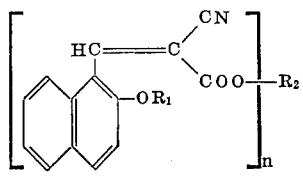

wherein $R_1$ is a radical selected from the group consisting of alkyl radicals of from 1 to 9 carbon atoms and alkenyl radicals of 3 to 9 carbon atoms and $n$ is an integer from 1 to 2, and when $n$ is 1, $R_2$ is a radical selected from the group consisting of alkyl, hydroxyalkyl, haloalkyl, cyanoalkyl, alkoxyalkyl, hydroxy alkoxyalkyl, carbalkoxyalkyl, alkenyl, aryl, substituted aryl, and hetero radicals, and when $n$ is 2, $R_2$ is a radical selected from the group consisting of alkylene, substituted alkylene, arylene, substituted arylene, and bi-substituted heterocyclic radicals.

2. A method as defined in claim 1 wherein $n$ is 1, and $R_1$ and $R_2$ are ethyl.

3. A method as defined in claim 1 wherein $n$ is 1, and $R_1$ and $R_2$ are methyl.

4. A method as defined in claim 1 wherein $n$ is 1, $R_1$ is alkenyl and $R_2$ is alkyl.

5. A method as defined in claim 1 wherein $n$ is 1, $R_1$ is alkyl and $R_2$ is heterocyclic.

6. A method as defined in claim 1 wherein $n$ is 2, $R_1$ is alkyl and $R_2$ is alkylene.

7. A method as defined in claim 1 wherein $n$ is 2, $R_1$ is alkenyl and $R_2$ is alkylene.

8. A method as defined in claim 1 wherein $n$ is 2, $R_1$ is alkyl and $R_2$ is arylene.

9. A method as defined in claim 10 wherein said organic carrier is nitrocellulose.

10. A method as defined in claim 1 wherein the absorber is present in an amount by weight of about 0.5% based on the weight of the organic carrier.

11. A method as defined in claim 10 wherein said organic carrier is a cellulose ester plastic material.

12. A method as defined in claim 10 wherein said organic carrier is polyethylene.

13. A method as defined in claim 10 wherein said organic carrier is a polyester resin.

14. A method as defined in claim 10 wherein said organic carrier is a natural wax.

References Cited

FOREIGN PATENTS 588,864  12/1959  Canada.

ALLAN LIEBERMAN, *Primary Examiner.*